(12) United States Patent
Visser et al.

(10) Patent No.: US 8,740,041 B2
(45) Date of Patent: Jun. 3, 2014

(54) EXTRUDED BRAZING RING WITH INTEGRATED FLUX

(75) Inventors: Jasper G. J. Visser, Sunrise Beach, MO (US); Jacobus C. B. Kotzé, Somerset West (ZA)

(73) Assignee: Flux Brazing Schweiss-Und Lotstoffe USA, LLC, Eldon, MO (US)

(*) Notice: Subject to any disclaimer, the term of this patent is extended or adjusted under 35 U.S.C. 154(b) by 0 days.

(21) Appl. No.: 13/541,443

(22) Filed: Jul. 3, 2012

(65) Prior Publication Data

US 2014/0008416 A1   Jan. 9, 2014

(51) Int. Cl.
*B23K 35/14* (2006.01)
*B21C 23/08* (2006.01)
*B21D 22/00* (2006.01)

(52) U.S. Cl.
USPC ............. 228/56.3; 72/253.1; 72/254; 72/274; 148/23; 148/24; 228/246

(58) Field of Classification Search
USPC ........... 228/56.3, 246; 72/253.1, 254; 148/23, 148/24
See application file for complete search history.

(56) References Cited

U.S. PATENT DOCUMENTS

| | | | |
|---|---|---|---|
| 400,869 A | 4/1889 | Norton et al. | |
| 2,055,276 A | 9/1936 | Brownsdon et al. | |
| 2,055,393 A | 9/1936 | Thomas | |
| 2,334,609 A | 11/1943 | Cox et al. | |
| 2,845,700 A | 8/1958 | Bagno | |
| 3,158,120 A | 11/1964 | Von Hessert | |
| 3,239,125 A | 3/1966 | Sherlock | |
| 3,491,934 A * | 1/1970 | Foote | 228/56.3 |
| 5,360,158 A | 11/1994 | Conn et al. | |
| 5,443,658 A | 8/1995 | Hermanek | |
| 5,781,846 A | 7/1998 | Jossick | |
| 6,070,789 A | 6/2000 | Conn et al. | |
| 6,164,517 A | 12/2000 | Kim | |
| 6,193,131 B1 | 2/2001 | Oud et al. | |
| 6,264,062 B1 * | 7/2001 | Lack et al. | 221/267 |

(Continued)

FOREIGN PATENT DOCUMENTS

| | | |
|---|---|---|
| GB | 1180735 | 2/1970 |
| GB | 1481140 | 7/1977 |
| WO | 2008073419 A2 | 6/2008 |

OTHER PUBLICATIONS

International Search Report for Corresponding PCT Application PCT/US2013/047559.

*Primary Examiner* — Devang R Patel
(74) *Attorney, Agent, or Firm* — Erickson, Kernell, Derusseau & Kleypas, LLC

(57) ABSTRACT

A brazing ring with integrated fluxing product and methods for production thereof is described. The brazing ring has a c-shaped body with a plurality of channels extending the thickness of the ring and disposed about the circumference thereof. The channels are separated by radially extending flanges with enlarged distal ends that extend into the channels. The enlarged ends at least partially enclose the channels to aid in retention of a fluxing product disposed in therein. The c-shape may enable flexure of the ring for installation on a pipe or fitting and a friction fit to maintain an installed position. The brazing ring is formed by extruding a filler material to form a tube with the desired profile and compressing the fluxing product into the channels of the profile. The tube is subsequently sectioned perpendicularly to its length to produce a plurality of the brazing rings.

5 Claims, 9 Drawing Sheets

(56) References Cited

U.S. PATENT DOCUMENTS

| | | |
|---|---|---|
| 6,830,632 B1 | 12/2004 | Fuerstenau et al. |
| 7,858,204 B2 | 12/2010 | Campbell et al. |
| RE42,329 E | 5/2011 | Fuerstenau et al. |
| 2007/0251602 A1* | 11/2007 | Gagnon et al. ............... 148/26 |
| 2008/0135134 A1 | 6/2008 | Kim |
| 2009/0014093 A1 | 1/2009 | Campbell et al. |
| 2009/0017328 A1 | 1/2009 | Katoh et al. |
| 2009/0101238 A1* | 4/2009 | Jossick et al. ............... 148/23 |
| 2009/0200363 A1* | 8/2009 | Means et al. ............... 228/246 |
| 2010/0065549 A1 | 3/2010 | Belohlav |
| 2010/0219231 A1 | 9/2010 | Means et al. |

\* cited by examiner

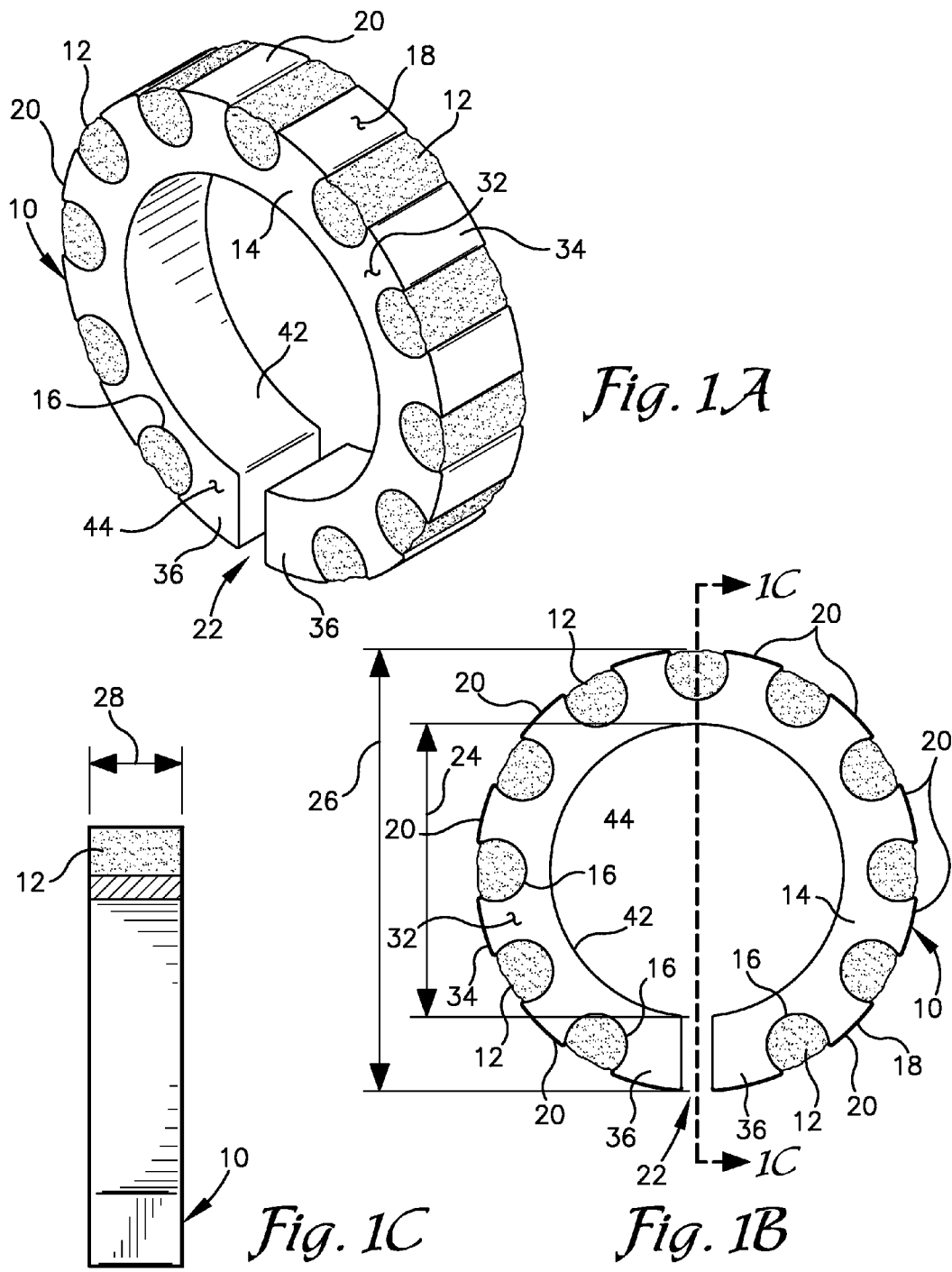

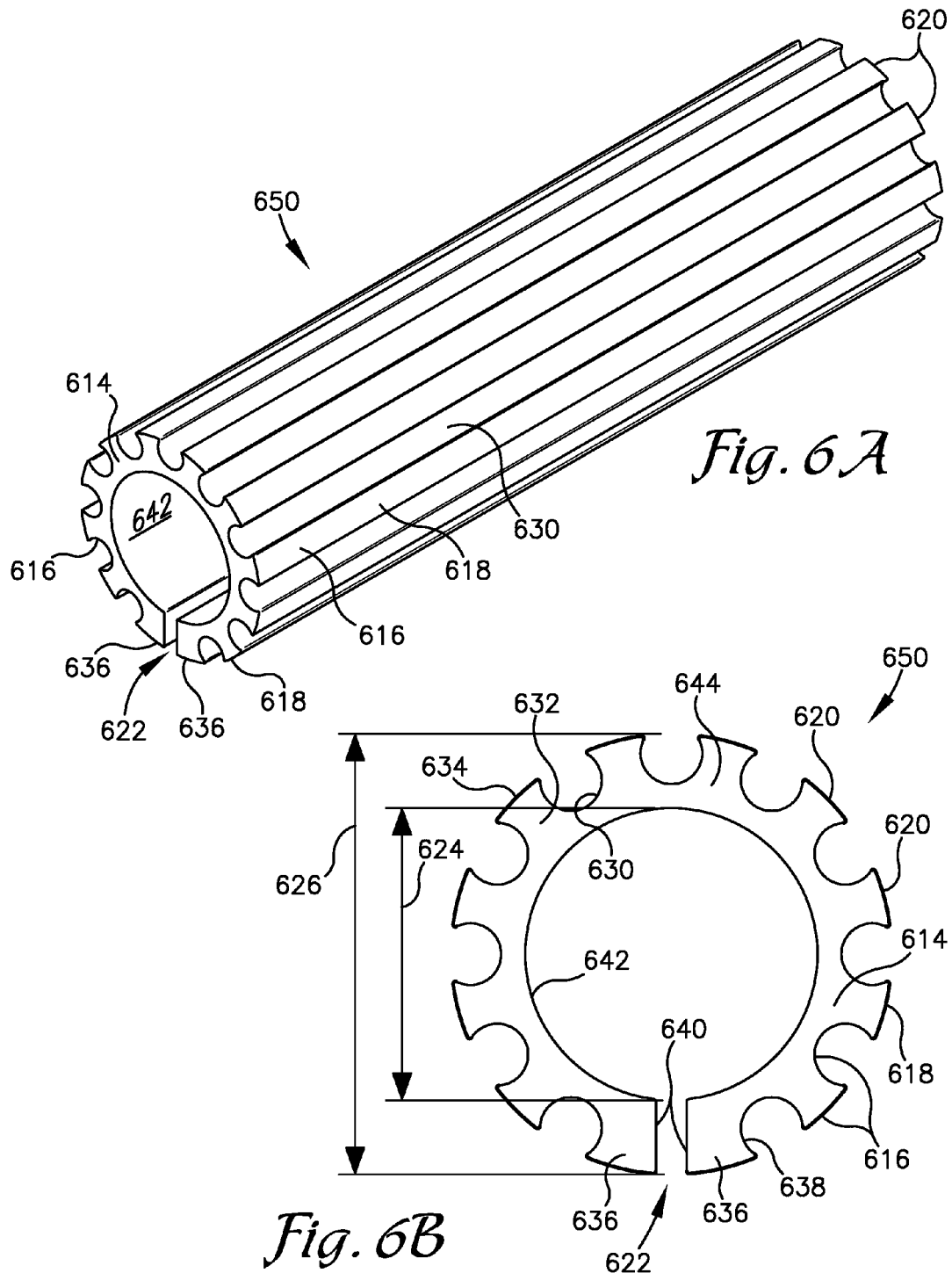

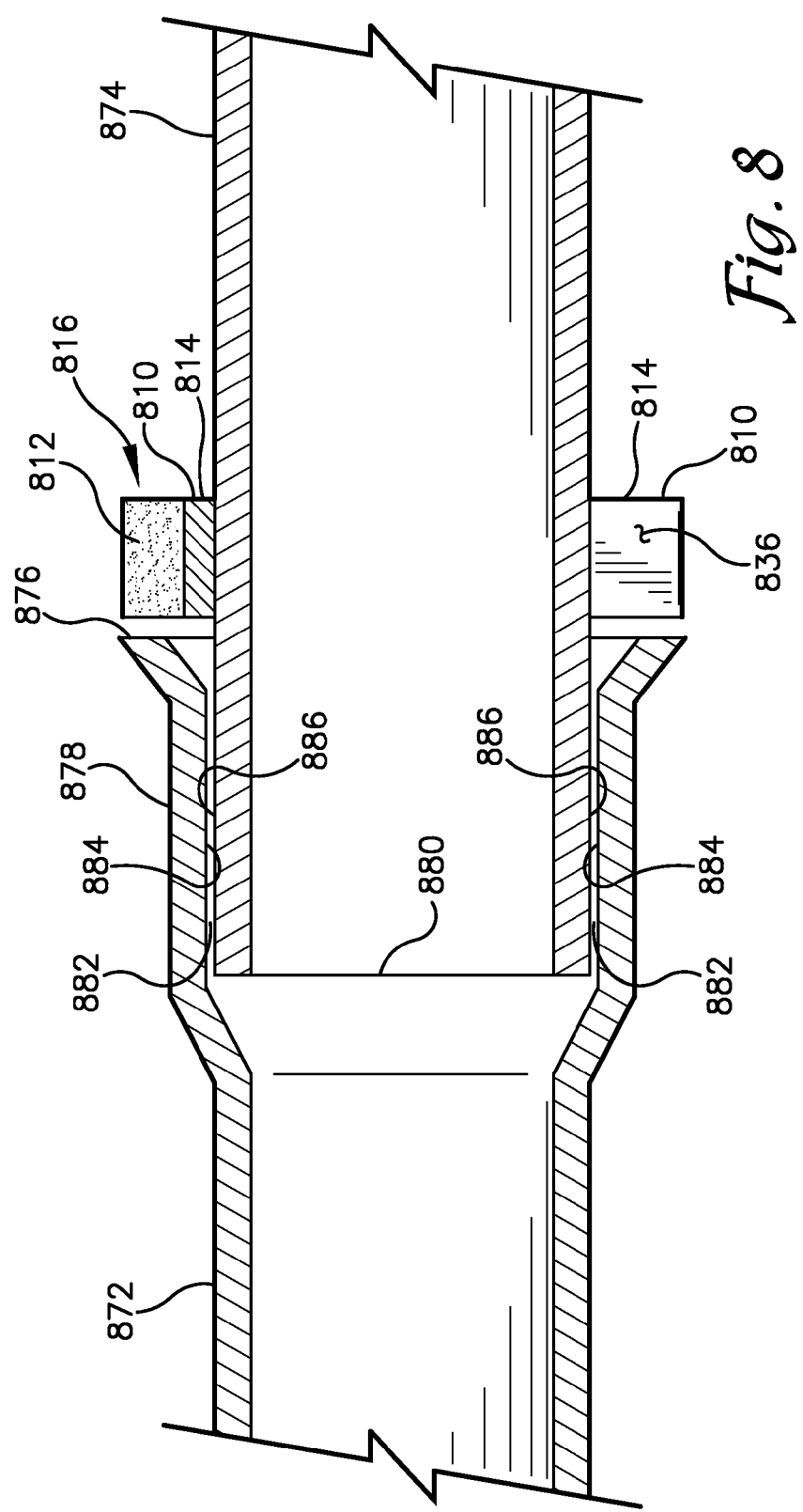

EXTRUDED BRAZING RING WITH INTEGRATED FLUX

BACKGROUND

Metal joining through soldering and brazing is well known in the art. Generally, soldering and brazing include flowing of a liquid filler metal into a joint between base metal components via capillary action; soldering using filler metals with melting points below about 450° C. and brazing employing filler metals with melting points above about 450° C. Various methods and materials are employed for such operations. One common example of which includes melting and flowing a lead-based solder wire into a joint between copper pipes in a household plumbing system.

It is also known to employ a fluxing product to aid in preparation of the base metals during soldering and brazing. Fluxing products aid in breaking down oxide layers on surfaces of the base metals and may protect the base metals during soldering/brazing among other benefits. The fluxing products can be applied prior to heating of the materials or might be melted and applied by the heating. The fluxing products are often incorporated with the filler material, such as interior to the filler material, e.g. flux-cored wire, or as a coating on the filler material. For example, U.S. Patent Publication No. 2009/0101238, to Jossick et al. describes coating wires comprised of filler materials with a fluxing product. Similarly, U.S. Patent Publication No. 2009/0014093, to Campbell et al. describes disposing fluxing material in a channel in a filler material wire. And U.S. Patent Publication No. 2010/0219231 to Means et al. describes filler materials formed into ring-shaped components that have channels or grooves extending laterally along the circumference of the component and that are filled with fluxing products.

Problems exist with these examples that hinder manufacturing and use of the components. Production of wire-based components requires subsequent forming steps either during manufacture or during use to cut and form the wire into a desired form, e.g. a ring. And production of ring components requires subsequent machining steps to form the channel about the circumference of the ring followed by packing or disposal of the fluxing product in the machined channel.

In use, these products fail to sufficiently wet the soldering/brazing material with flux. The soldering/brazing material thus fails to flow into the joint to be soldered/brazed because, for example, the surface tension of the melted soldering/brazing material is too high. Both wire-based and ring forms often fail to provide a sufficient snug or friction fit with a pipe or fitting on which they are installed. As such, the wire or ring components may fall off or move out of position before completion of the soldering or brazing operation. Further, due to the subsequent forming steps required and/or the restriction on the channel profiles available through machining, retention of the fluxing product in the channels can be an issue.

There remains a need for a soldering and brazing ring that is easily manufactured with an integrated fluxing product; that enables wetting of the ring by the fluxing product; and that is configured to positively retain the fluxing product to avoid dislodging of the fluxing product during handling. A soldering or brazing ring that is adaptable to variation in pipe and fitting diameter and that provides a friction fit with a pipe or fitting to aid in maintaining an installed position of the ring would also be beneficial.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, an extruded brazing ring with integrated fluxing product and methods for its manufacture.

In an embodiment, the brazing ring includes a c-shaped body with a plurality of channels that extend the thickness of the body and that are disposed about the outer perimeter thereof. The channels are separated by flanges extending radially outward from the body and are filled, at least partially, with a fluxing product. The flanges may include an enlarged distal end that at least partially encloses the channel and aids in retaining the fluxing product therein. Opposing ends of the c-shaped body include end flanges. The end flanges have a volume sufficient to fill the gap between the opposing ends with filler material during brazing. The configuration of the channels about the perimeter of the c-shaped body enable wetting of substantially the entire body by the fluxing product upon melting thereof.

In an embodiment, the brazing ring is configured for manufacturing via extrusion of the filler material to form a tube of the desired cross-sectional profile. The tube is then passed to a filling apparatus for packing or disposal of the fluxing product in the channels. The tube is then cut or sectioned perpendicular to its length to produce the brazing rings in any desired thickness.

DESCRIPTION OF THE DRAWINGS

Illustrative embodiments of the invention are described in detail below with reference to the attached drawing figures, and wherein:

FIG. 1A is a perspective view of a brazing ring with integrated flux depicted in accordance with an embodiment of the invention;

FIG. 1B is an elevational view of the brazing ring with integrated flux of FIG. 1A;

FIG. 1C is a cross-sectional view of the brazing ring with integrated flux of FIG. 1 taken along line C-C depicted in FIG. 1B;

FIG. 6A is a perspective view of an extruded tube having the profile of a brazing ring in accordance with an embodiment of the invention;

FIG. 6B is an elevational view depicting the profile of the extruded tube of FIG. 6A;

FIG. 8 is a cross-sectional view of a pipe joint prior to a brazing operation with a brazing ring installed in accordance with an embodiment of the invention.

DETAILED DESCRIPTION

Figure 1D:
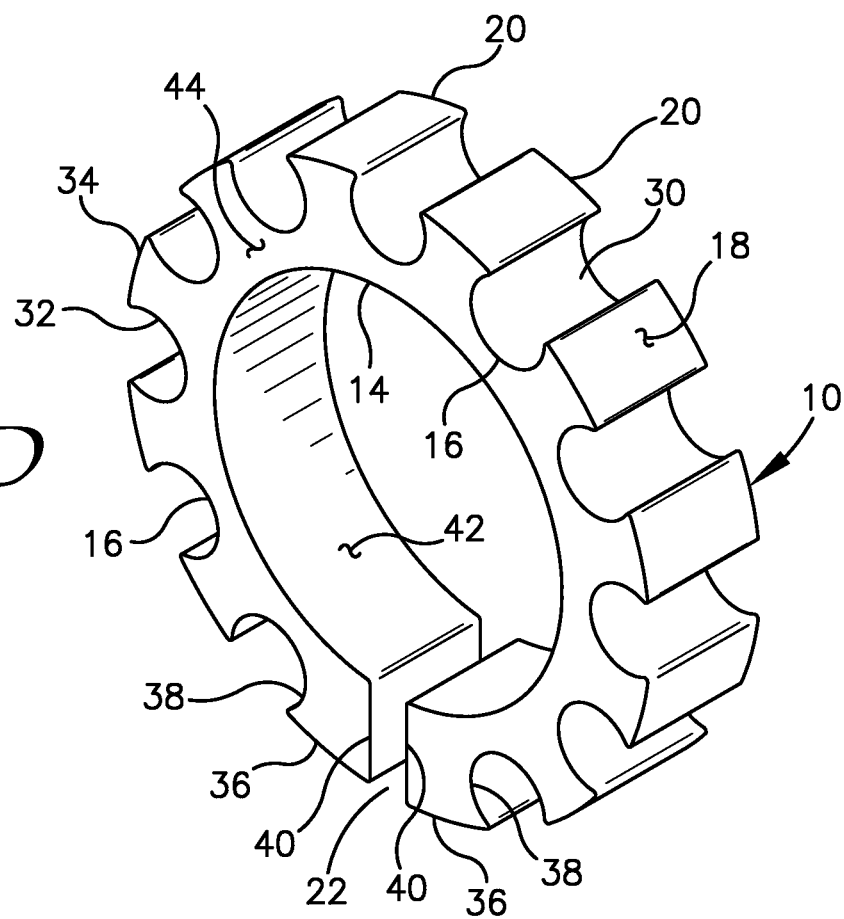
FIG. 1D is a perspective view of the brazing ring of FIG. 1A depicted without the integrated flux.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention are described herein with respect to the drawings in which reference numerals are employed to identify particular components or features. Similar elements in the various embodiments depicted are provided with reference numerals having matching second and third digits but with differing first digits, e.g. element 10 is similar to elements 110, 210, etc. Such is provided to avoid redundant description of similar features of the elements but is not intended to indicate in any way that the elements are identical.

Referring initially to FIGS. 1A-D, a brazing ring 10 with integrated flux 12 is described in accordance with an embodiment of the invention (FIG. 1D depicting the brazing ring 10 without the flux 12 integrated therein.) The ring 10 is described herein with respect to brazing, however such is not intended to limit embodiments of the ring 10 to any particular joining method. As referred to herein, brazing is intended to be inclusive of brazing, soldering, braze welding, welding, and any similar joining operations in which embodiments of the ring 10 might be employed. Further, joining is described herein with respect to joining of metal components but embodiments of the invention are not so limited. Similar process of joining ceramics, plastics, or other materials with similar or dissimilar materials are understood by Applicants and are within the scope of embodiments of the invention described herein.

The ring 10 includes a body 14 with a plurality of channels 16 disposed in an outer surface 18 thereof and separated by radially extending flanges 20. The body 14 has a substantially hollow cylindrical or annular form with a gap 22 in the circumference thereof that provides a c-shaped profile. The body 14 has an inner diameter 24, outer diameter 26, and thickness 28 of any desired dimensions. In an embodiment, the inner diameter 24 of the body 14 is configured to be the same or smaller than a pipe or fitting on which the ring 10 is to be disposed. The dimensions 24, 26, 28 of the body 14 preferably are configured to provide a predetermined volume of filler material to a joint to be brazed as described below.

The body 14 is formed from one or more filler materials. The filler materials include, for example, metals like aluminum, nickel, cobalt, copper, silver, zinc, lead, and non-metals like silicon and phosphorous, however any desired filler materials might be used in embodiments of the invention. In an embodiment, the filler material includes an alloy comprising aluminum in combination with silicon or zinc or both silicon and zinc. In an embodiment, the filler material is an alloy comprising about 60-80% aluminum, about 0-15% silicon, and about 0-25% zinc, or more preferably about 70-75% aluminum, 5-10% silicon, and about 15-20% zinc, or about 72.8% aluminum, 8.7% silicon, and about 18.5% zinc, however any combination of materials can be employed as desired.

Figure 3A:
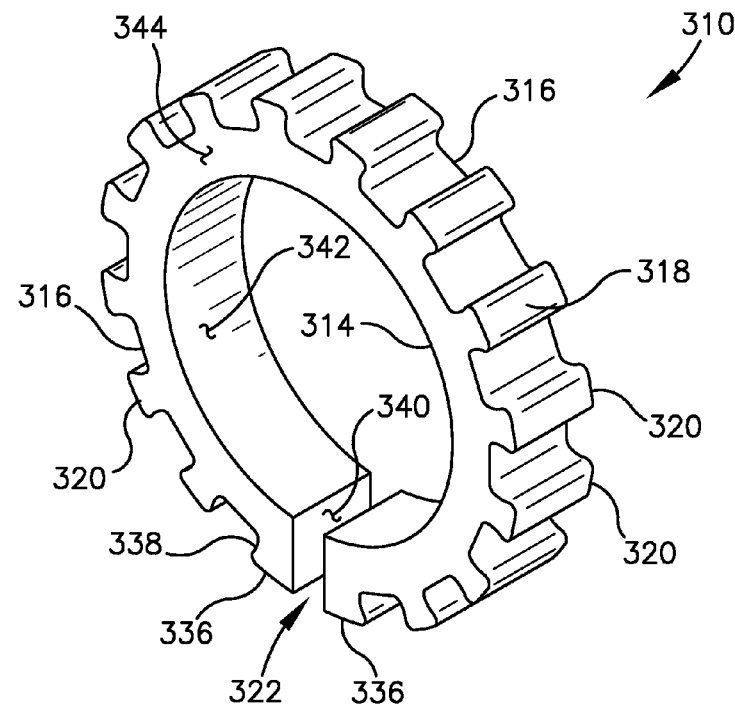
FIG. 3A is perspective view of a third brazing ring depicted in accordance with an embodiment.
Figure 3B:
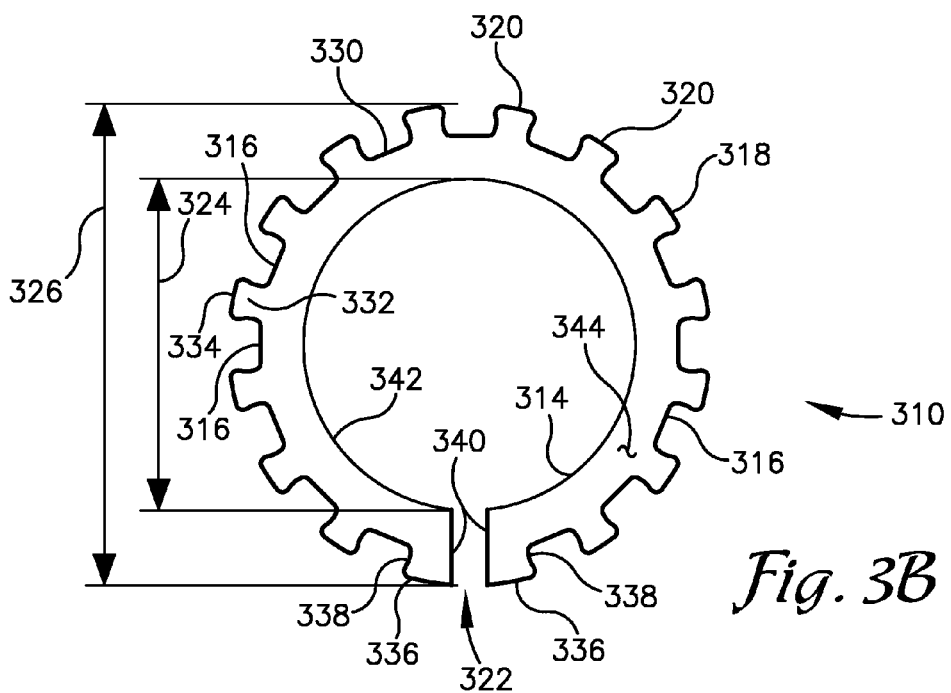
FIG. 3B is an elevational profile view of the third brazing ring of FIG. 3A.
Figure 4A:
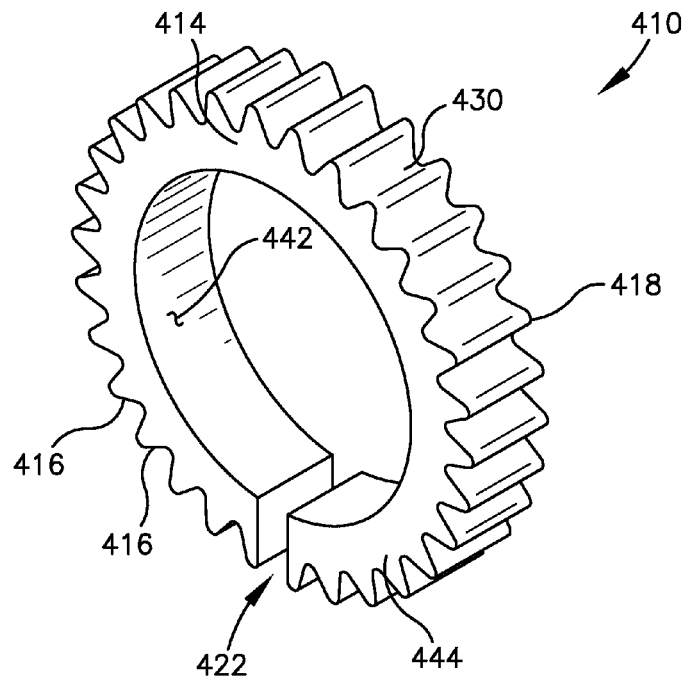
FIG. 4A is perspective view of a fourth brazing ring depicted in accordance with an embodiment of the invention.
Figure 4B:
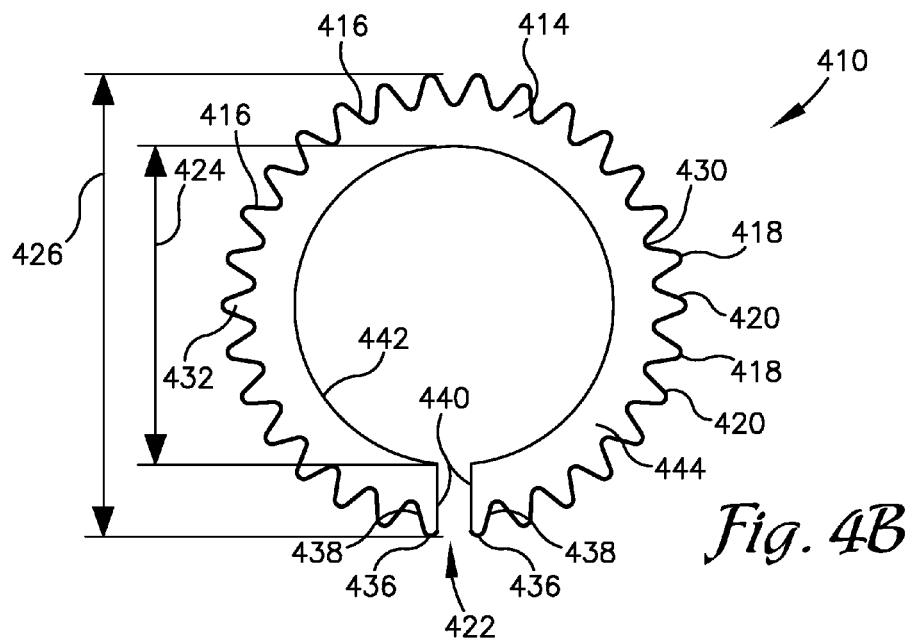
FIG. 4B is an elevational profile view of the fourth brazing ring of FIG. 4A.
Figure 5:
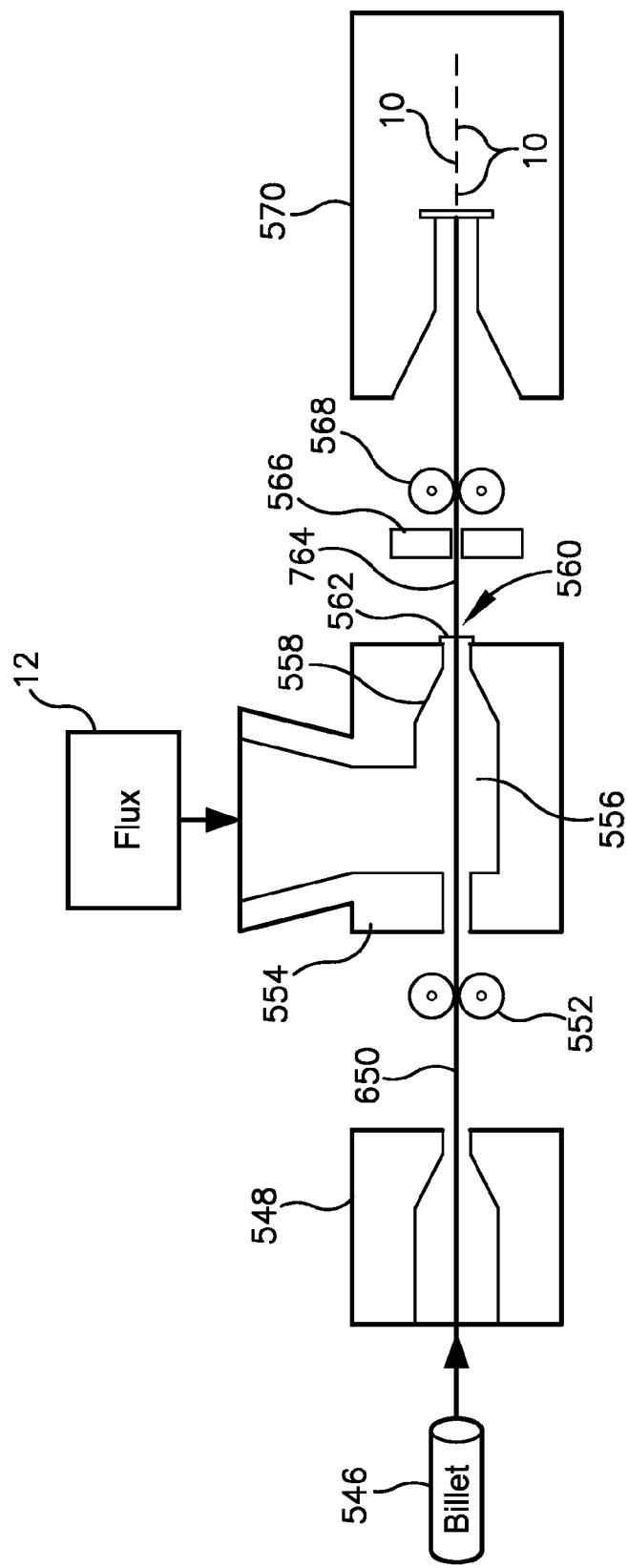
FIG. 5 is a block diagram depicting a manufacturing line for production of a brazing ring with integrated flux in accordance with an embodiment of the invention.

The channels 16 in the outer surface 18 of the body 14 are configured to receive and retain the flux 12 disposed therein. The channels 16 extend the full thickness 28 of the body 14 and may be of varying cross-sectional shape. In the embodiment depicted in FIGS. 1A-D and FIGS. 2A-B, the channels 16, 216 have a substantially circular cross-sectional shape. In the embodiment depicted in FIGS. 3A-B, the channels 316 have a generally rectangular cross-sectional shape with an inner face 330 defined along a circumference that is at a shorter radial distance than the outer surface 318 of the ring 310 and a pair of sidewalls 332 defined by the flanges 320. The profile of sidewalls 332 may be linear or curvilinear. Or, as shown in the embodiment depicted in FIGS. 4A-B, the channels 416 may have a substantially triangular cross-sectional shape. As shown in the drawings, all of the channels 16 in the ring 10 have the same cross-sectional shape. However, the channels can have different shapes.

Any number of channels 16 can be included in the ring 10. In the embodiments shown, channels 16 are evenly spaced about the circumference of the ring 10, but the arrangement of the channels 16 about the circumference of the ring 10 may be varied. The number and dimensions of the channels 16 is configurable to provide a desired volume in which the flux 12 can be disposed as described below.

In an embodiment shown in FIGS. 1A-D, each flange 20 comprises a leg 32 with an enlarged distal end 34. The enlarged distal end 34 extends at least partially across or over a respective channel 16 to at least partially overhang or enclose the channel 16. As such, as depicted in FIGS. 1A-D, the circular profile of the channel 16 includes an arc of greater than 180°. As shown in FIGS. 1A-D and 2A-B the arc of the channel 16 or 216 might range between approximately 200° to 250°. As depicted in FIGS. 3A-B, the enlarged end 334 protrudes over at least a portion of the channel 316 to form an overhang.

The body 14 also includes a pair of end flanges 36 disposed on opposing sides of the gap 22. Each end flange 36 includes a first side 38 that forms a portion of an adjacent channel 16 and a second side 40 that defines the gap 22. The second side 40 is shown as a flat plane aligned along a radius of the ring 10 although, it is foreseen that other profiles might be utilized. In the embodiment shown, the end flanges 36 are larger or have a greater volume than the flanges 20. The larger volume of the end flanges 36 is adapted to provide additional filler material to compensate for the gap 22 during brazing.

The flux 12 comprises fluxing products available in the art and may include a binder to aid in retaining the fluxing products in a solid or semi-solid form. In one embodiment, the flux comprises one or more of potassium tetrafluoroaluminate and cesium tetrafluoroaluminate. In another embodiment, the flux contains a mixture of 5-50% cesium tetrafluoroaluminate and 50-95% potassium tetrafluoroaluminate.

Any available binder might be employed with the chosen fluxing products including polymers derived from petroleum, acrylics, or carbon dioxide. The binder can comprise any percentage by weight of the total fluxing product. In an embodiment, the binder comprises up to about 5% of the total weight of the fluxing product or, more preferably comprises about 1 to about 1.25% of the total weight. The binder might be one or more of a thermoplastic, a copolymer, and a polyalkylene carbonate. In one embodiment, the binder comprises QPAC® polymer beads manufactured by Empower Materials, Inc. of New Castle, Del., USA. In another embodiment, the binder is DAREX RZ11-C081-2.

In one embodiment, the flux 12 is produced by dissolving the chosen binder in a solvent such as glycol or methyl ethyl ketone (MEK) and adding the fluxing products to the solution in powdered form. For example, QPAC® polymer beads might be dissolved in an MEK solvent and potassium tetrafluoroaluminate and cesium tetrafluoroaluminate powders added to the solution. As such, the flux 12 is produced in a thick paste-like form. The flux 12 can subsequently be heated to evaporate the solvent and to thereby at least partially harden the flux 12 to a desired extent.

Figure 2A:
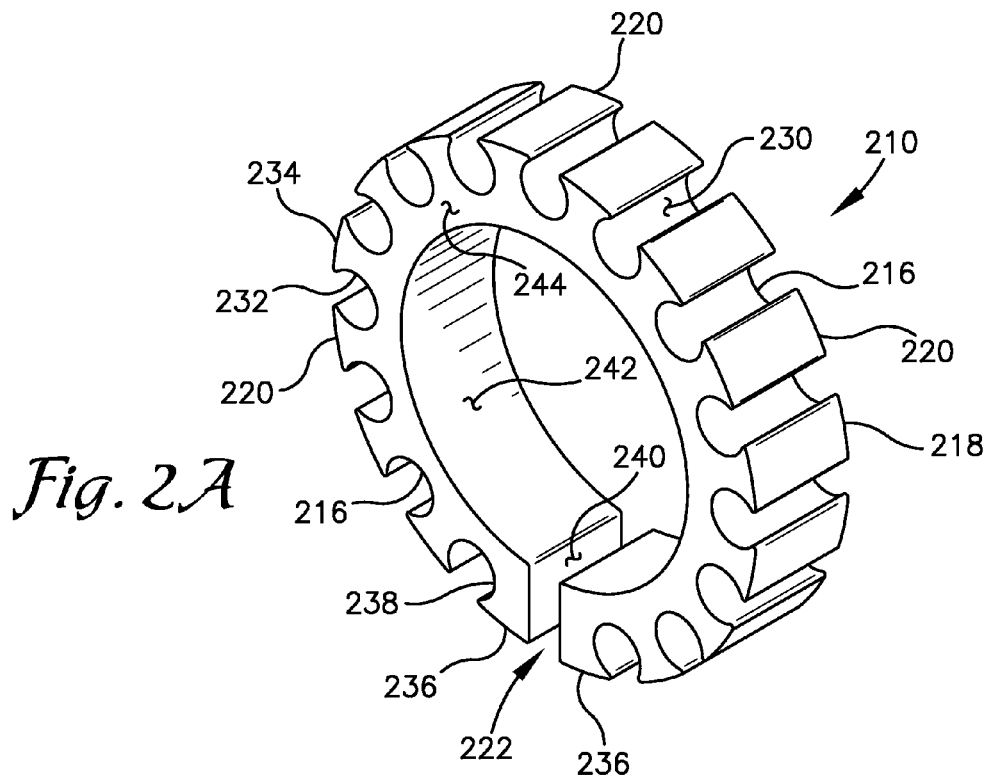
FIG. 2A is a perspective view of a second brazing ring depicted in accordance with an embodiment of the invention.
Figure 2B:
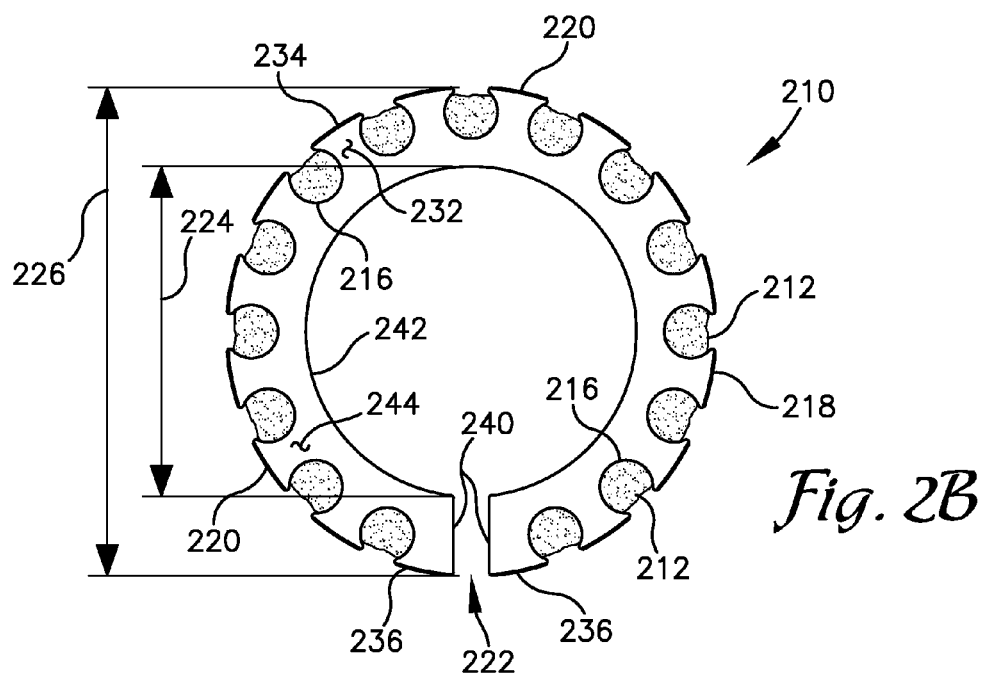
FIG. 2B is an elevational profile view of the brazing ring of FIG. 2A with flux disposed in and partially filling channels therein.

The flux 12 completely fills the channels 16, as depicted in FIGS. 1A-C, or may only partially fill the channels 16, such as the channels 216 depicted in FIG. 2B. The flux 12 can be disposed in all of the channels 16 or one or more of the channels 16 might not be filled with the flux 12. In an alternative embodiment, more than one flux formulation 12 is used and one or more of the channels 16 are filled with different flux formulations 12. The flux 12 might also be coated on the outer surface 18, an inner surface 42, or a face 44 of the body 14.

With additional reference now to FIGS. 5, 6A-B, and 7A-B, a method for producing the brazing ring 10 is described in accordance with an embodiment of the invention. Initially a billet 546 of filler material is provided. The billet 546 can be produced by any methods known in the art and has a composition desired in the final brazing ring 10. The billet 546 might also include one or more alloying elements or additives and/or be subjected to one or more heat treatments or other processes to impart material characteristics desired in the brazing ring 10 or to aid in the manufacturing processes described below. Although a billet 546 is described herein, such is not intended to limit the form of the raw filler materials used in embodiments of the invention, e.g. the filler materials might comprise powders, ingots, bars, or the like.

The billet 546 is extruded by an extrusion press 548, through a die (not shown) to form a pipe or tube 650, as best depicted by FIG. 6A, having a cross-sectional profile (depicted in FIG. 6B) matching that of the brazing ring 10. In an embodiment, the billet 546 is heated to about 500° C. for extrusion. Extrusion of the billet 546 to form the tube 650 is completed by methods known in the art.

Following extrusion, the tube 650 might be heat treated or otherwise processed to impart desired material properties. In an embodiment, the tube 650 is cooled from an approximately 500° C. extrusion temperature to approximately 450° C. at a controlled rate within about 2 minutes after extrusion. The tube 650 is also passed through one or more straightening rolls 552 and/or forming rolls, hereinafter collectively referred to as rolls 552. The rolls 552 provide straightening of deformities in the tube 650 that occur during extrusion or subsequent processing. The rolls 552 can also provide additional forming of the tube 650 to produce a desired profile. Additionally, the rolls 552 might act as drive rolls to drive the tube 650 along its path to the next stage of processing. In an embodiment, the rolls 552 receive the tube 650 directly from the extrusion press 546 during or after extrusion thereof.

Figure 7A:
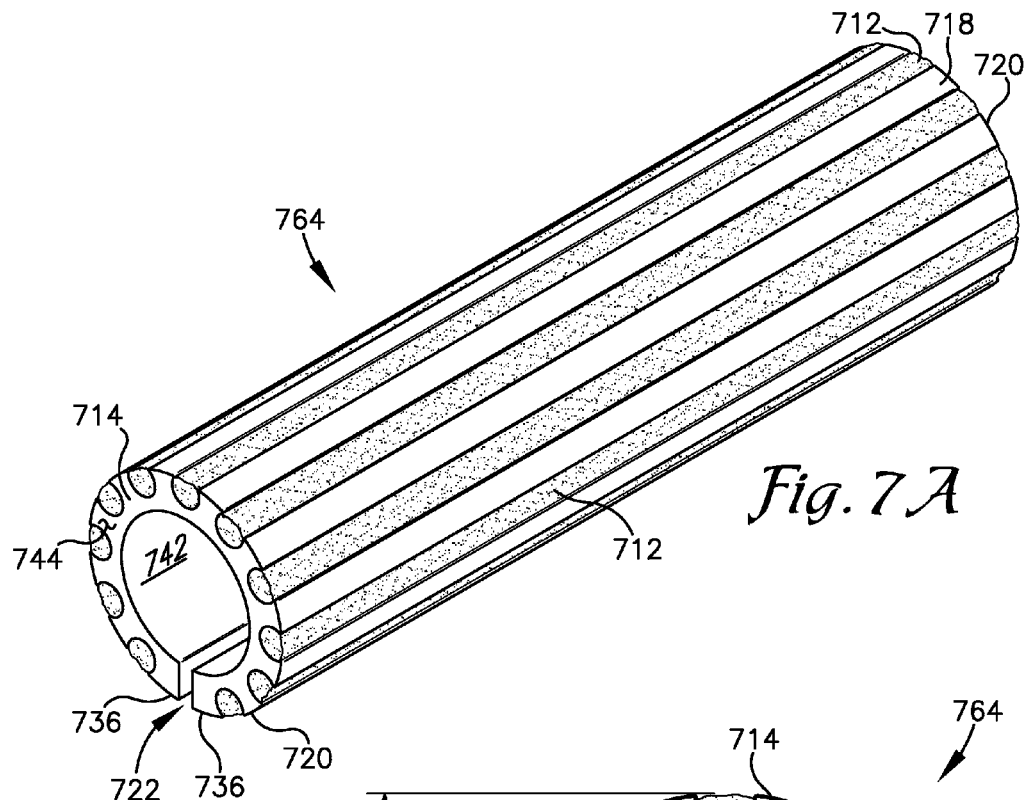
FIG. 7A is a perspective view of the extruded tube of FIG. 3A with flux integrated into channels therein.
Figure 7B:
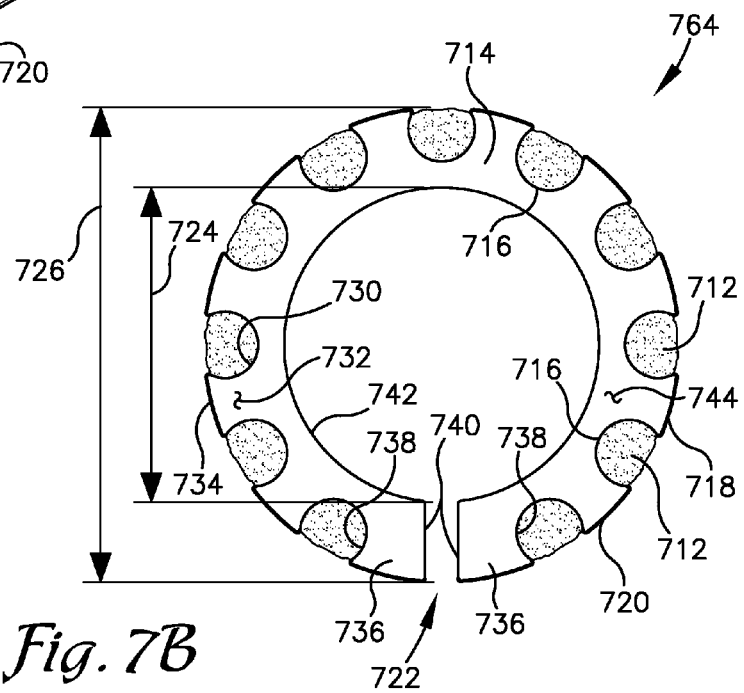
FIG. 7B is an elevational view of the profile of the extruded tube of FIG. 7A.

The tube 650 is advanced to a filling apparatus 554. The filling apparatus 554 includes a reservoir 556 containing the flux 12 through which the tube 650 is driven. In an embodiment, the reservoir 556 is pressurized and includes a conical portion 558 leading to an exit aperture 560. The pressurization of the reservoir 556 forces the flux 12, which is in a paste-like form, into the channels 616 of tube 650 as the tube 650 passes through the reservoir 556 to produce a tube 764 with integrated flux, as best depicted in FIGS. 7A-B. The tube 764 is identical to the tube 650 but for the addition of the flux 12 in the channels 716 thereof.

The exit aperture 560 may include one or more wiping features 562 configured to wipe the flux 12 from the outer 718 and inner 742 surfaces of the tube 764. The wiping features 562 can be configured to remove all or nearly all of the flux 12 from the surfaces 718, 742. Or the wiping features 562 might leave a coating of the flux 12 on one or more of the surfaces 718, 742 or portions thereof. In another embodiment, the wiping features 562 are configured to remove all or a portion of the flux 12 from one or more of the channels 716 of the tube 750. In such an embodiment, the tube 764 might be passed through a second filling apparatus to dispose another flux of the same or different composition in any unfilled or partially filled channels 716 in the tube 764.

After deposition of the flux 12 into the channels 716, the flux 12 is dried to remove at least a portion of the solvent contained therein. The drying is completed by passing the tube 764 through a heating element 566 that is integral with the filling apparatus 554 or that is subsequent to the filling apparatus 554 in the production line. The heating element 566 is any available heating device in the art including, for example and not limitation, radiant heating elements, heated air blowers, induction heating coils, or combinations thereof. Or drying of the flux 12 might be completed using residual heat contained in the tube 764. When the tube 764 is fed directly from the extrusion press 548 to the filling apparatus 554, the tube 764 may be relatively hot. Such residual heat might be sufficient to dry the flux 12 after disposal in the channels 716.

The tube 764 is also optionally passed through one or more second sets of rolls 568 to cure any deformities that might be incurred during processing of the tube 764. The rolls 568 might also provide one or more forming operations to impart changes in the profile of the tube 764. And the rolls 568 can draw the tube 764 through the filling apparatus 554 and/or drive the tube 764 on to subsequent production components or operations. In an embodiment, the rolls 568 are heated rolls that function as the heating elements 566 to dry the flux 12.

The tube 764 is subsequently passed to a sectioning apparatus 570 that sections the tube 764 transverse to its length to form the brazing rings 10, as depicted in FIGS. 1A-C. The sectioning apparatus 570 employs any cutting technology including, circular saw blade, band saws, knives, laser cutting, water-jet, or the like. The sectioning apparatus 570 is configured to section the tube 764 to produce the brazing rings 10 in any desired thickness 28. The brazing rings 10 can be further processed to remove cutting debris, apply additional flux 12 to faces 44 of the body 14 thereof, package the brazing rings 10 for transport, or the like.

Referring now to FIG. 8, use of a brazing ring 810 to join a first pipe 872 to a second pipe 874 is described in accordance with an embodiment of the invention. The first and second pipes 872, 874 comprise any components desired to be joined by brazing, soldering, or like methods as described previously above. In an embodiment, the first and second pipes 872, 874 include components of heat exchanger coils in a HVAC (heating, ventilation, air-conditioning system). An end 876 of the first pipe 872 includes or is prepared to provide an enlarged or flared portion 878 configured to accept an end 880 of the second pipe 874. In the embodiment shown, the first pipe 872 has an inner diameter that is sufficient to accept the second pipe 874 therein. The ends 876 and 880 are cleaned of any debris or other contaminates that may have deleterious effects on the joint or brazing process.

The brazing ring 810 has an inner diameter that is the same as or slightly smaller than an outside diameter of the second pipe 874. As such, the brazing ring 810 is at least partially flexed in order to insert the second pipe 874 into the brazing ring 810. The brazing ring 810 is slidably moved into a desired position and resistance of the brazing ring 810 to the flexure provides a snug friction fit around the second pipe 874 to retain the brazing ring 810 in the desired position. In an embodiment, the brazing ring 810 is substantially rigid and is not flexed for insertion of the second pipe 874, e.g. the inner diameter of the brazing ring 810 is sufficient to accept the second pipe 874 therein. Such dimensions might be configured to provide a snug friction fit around the second pipe 874 without flexure of the brazing ring 810. The second pipe 874 is subsequently inserted into the enlarged portion 878 of the first pipe 872 and the brazing ring 810 placed at or adjacent to the end 876 of the first pipe 872.

Next, the brazing ring 810 and/or the first and second pipes 872, 874 are heated. The heating of the brazing ring 810 first causes melting of the flux 812; the flux 812 is selected or formulated to have a melting temperature that is less than the melting or solidus temperature of the filler materials. Upon melting, the flux 812 flows out of the channels 816 in the brazing ring 810 and covers or wets exposed surfaces of the brazing ring 814 and the surfaces 884, 886 of the pipe sections 872, 874 in the joint area with the liquefied flux 812. In one embodiment, the liquefied flux 812 wets substantially all exposed surfaces of the brazing ring 814 and the surfaces 884, 886 in the joint area due to the surface tension of the liquefied flux 812. The liquefied flux 812 prepares the wetted surfaces 884, 886 and/or surfaces of the brazing ring 814 by, for example, removing oxides thereon and prevents further oxidation of the wetted surfaces 884, 886. The liquefied flux 812 is also formulated to sufficiently lower the surface tension of melted brazing ring material to enable the molten material to flow into a space 882 between the first and second pipes 872, 874.

Upon heating of the brazing ring 810 to an appropriate temperature, typically higher than the melting temperature of the flux 812, the brazing ring 810 melts. In an exemplary embodiment, the brazing ring 810 melts in progressive stages which functions to allow the liquefied flux 812 to cover all of the molten material of brazing ring 810. A combination of liquefied flux 812 and molten brazing ring material flows into the open joints by, for example, capillary action due to induced lowered surface tension. The liquefied flux 812 continues to prevent further oxidation of the molten brazing ring material during flowing. Impurities and other reactive elements are bonded into the liquefied flux 812 by chemical reaction.

The brazing ring 810 is configured to provide a volume of filler material sufficient to cover exposed surfaces 884, 886 and to fill or at least partially fill the space 882; at least a portion of the space 882 is filled about the full circumference of the second tube 874 to seal the joint, however the full longitudinal length of the space may not be entirely filled with filler material. In an embodiment, as described above, the end flanges 836 of the brazing ring 810 have a volume sufficient to fill the space 882 in the area of the gap 822, e.g. the molten filler material flows longitudinally into the space 882 and laterally across the area of the space 882 associated with the gap 822.

The appropriate melting temperature is a combination of one or more of the melting, solidus, and/or liquidus temperatures of the filler material depending on the composition of the filler material and the characteristics thereof. For example, the filler material may have a melting range in which it is partially melted. The partially melted filler material may easily flow into the space 882 or may be too viscous to do so until reaching a fully liquid state, e.g. the liquidus temperature. The appropriate temperature for flowing the brazing ring 810 into the space 882 is less than the melting or solidus temperature of the base materials that make up the first and second pipes 872, 874.

Flowing of the molten filler material into the space 882 displaces, evaporates, burns out, or otherwise removes all or part of the flux 812 on the surfaces 884, 886 of the first and second pipes 872, 874. The filler material is subsequently cooled and solidified to bond the first and second pipes 872, 874 together. Additional processes can be performed to, for example, remove excess or residual flux 812 or filler material on the pipes 872, 874, among other processes.

Many different arrangements of the various components depicted, as well as components not shown, are possible without departing from the scope of this description and the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What claimed is:

1. A method for forming an extruded brazing ring with integrated flux, the method comprising:

extruding a filler material from an extrusion unit to produce a tube with a c-shaped cross-sectional profile that includes a pair of opposing, non-contacting ends, the tube including a plurality of channels disposed in and open to a surface thereof, the channels extending parallel to the length of the tube;

receiving the tube from the extrusion unit by a filling apparatus, the filling apparatus including a pressurized reservoir containing a fluxing product in a paste-like form, the tube being received in the reservoir to pass through the fluxing product;

disposing the fluxing product in the plurality of channels, pressurization of the reservoir flowing the paste-like fluxing product into the channels as the tube passes through the reservoir;

wiping at least a portion of the fluxing product from a surface of the tube by a wiping feature associated with the filling apparatus;

heating the fluxing product in the channels to remove at least a portion of a solvent included in the fluxing product; and sectioning the tube perpendicularly to the length thereof.

2. The method of claim 1, further comprising:
performing one or more straightening operations.

3. The method of claim 1, wherein extruding, disposing, and sectioning are completed in a continuous production line.

4. The method of claim 1, wherein each of the channels in the plurality have a V-shaped cross-section.

5. An extruded brazing ring with integrated flux formed by the method of claim 1.

* * * * *